UNITED STATES PATENT OFFICE.

BENEWELL BOWSHIER, OF CIRCLEVILLE, OHIO.

HOG-CHOLERA COMPOUND.

SPECIFICATION forming part of Letters Patent No. 237,237, dated February 1, 1881.

Application filed March 29, 1880. (No specimens.)

*To all whom it may concern:*

Be it known that I, BENEWELL BOWSHIER, of Circleville, in the county of Pickaway and State of Ohio, have invented a new and valuable Improvement in Medicine for the Prevention and Cure of Hog-Cholera; and I do hereby declare that the following is a full, clear, and exact description of the same.

This medicine is composed of the following ingredients, in the proportions specified, to wit: Epsom salts, two ounces; linseed-oil, two ounces; turpentine, one dram, (fluid;) black sulphuret of antimony, forty grains. In compounding, the salts and antimony are first mixed together and the other ingredients are then added.

The mixture is to be given in the drink, and, as above described, forms a dose for one hog.

The different ingredients are designed to act as follows: the salts as a laxative, the linseed-oil to keep down inflammation of the bowels and cool the same, the turpentine to scatter and keep down the fever, and the antimony to prevent the "thumps" and allay hard and difficult breathing—symptoms which always attend a case of hog-cholera before death.

Having described this invention, what I claim, and desire to secure by Letters Patent, is—

The medicine for hog-cholera consisting of Epsom salts, linseed-oil, turpentine, and black sulphuret of antimony, in the proportions substantially as specified.

In testimony that I claim the above I have hereunto subscribed my name in the presence of two witnesses.

BENEWELL BOWSHIER.

Witnesses:
J. WHEELER LOWE,
ISAEL P. TODD.